US008788784B2

(12) United States Patent
Deng et al.

(10) Patent No.: US 8,788,784 B2
(45) Date of Patent: Jul. 22, 2014

(54) METHOD AND DEVICE FOR STORING AND READING/WRITING COMPOSITE DOCUMENT

(75) Inventors: Libo Deng, Shenzhen (CN); Yi Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 60 days.

(21) Appl. No.: 13/537,950

(22) Filed: Jun. 29, 2012

(65) Prior Publication Data

US 2012/0272034 A1 Oct. 25, 2012

Related U.S. Application Data

(63) Continuation of application No. PCT/CN2010/079876, filed on Dec. 16, 2010.

(30) Foreign Application Priority Data

Jan. 8, 2010 (CN) .......................... 2010 1 0042692

(51) Int. Cl.
*G06F 12/02* (2006.01)
(52) U.S. Cl.
USPC ........... 711/171; 711/154; 711/156; 711/170; 711/205; 711/207; 711/221
(58) Field of Classification Search
USPC .......... 711/171, 154, 156, 170, 205, 207, 221
See application file for complete search history.

(56) References Cited

U.S. PATENT DOCUMENTS

| | | | | |
|---|---|---|---|---|
| 7,577,642 | B2 * | 8/2009 | Liu et al. ............................... | 1/1 |
| 7,783,854 | B2 * | 8/2010 | Camiel ......................... | 711/170 |
| 8,549,108 | B2 * | 10/2013 | Kini et al. ...................... | 709/218 |
| 2002/0103809 | A1 * | 8/2002 | Starzl et al. .................... | 707/102 |
| 2005/0251617 | A1 * | 11/2005 | Sinclair et al. ................. | 711/103 |
| 2008/0016088 | A1 * | 1/2008 | Liu et al. ....................... | 707/100 |
| 2008/0288738 | A1 | 11/2008 | Gokhale et al. | |

FOREIGN PATENT DOCUMENTS

| | | |
|---|---|---|
| CN | 101095115 A | 12/2007 |
| CN | 101414299 A | 4/2009 |
| EP | 0892355 A1 | 1/1999 |

OTHER PUBLICATIONS

International Search Report; mailed Mar. 24, 2011; PCT/CN2010/079876, 2 pages.
Russian Office Action dated Jan. 20, 2014; Russian Application No. 2012133000, translated to English pp. 1-9.

* cited by examiner

*Primary Examiner* — Stephen Elmore
(74) *Attorney, Agent, or Firm* — Harness, Dickey & Pierce, P.L.C.

(57) ABSTRACT

A method and device for storing and reading/writing a composite document are disclosed. The method includes: an initial storing area is pre-allocated for an inner controlling stream of the composite document and the initial storing area is continuous sectors or sector clusters; the inner controlling stream is stored in the initial storing area. The patches of a user data stream and the inner controlling stream in the composite document are reduced using the method or device. Correspondingly, pre-allocating storing area makes the probability of continuously storing the user data stream and the inner controlling stream in the composite document increased. The I/O can be optimized by introducing a strategy of reading cache and writing in a batch size, which can improve the efficiency of reading and writing.

16 Claims, 7 Drawing Sheets

METHOD AND DEVICE FOR STORING AND READING/WRITING COMPOSITE DOCUMENT

FIELD OF THE INVENTION

The present invention relates to data processing technologies, and more particularly, to a method and device for storing and reading/writing a composite document.

BACKGROUND ART

One composite document contains not only text but also graphics, spreadsheet data, sound, video image and other information. For example, files such as message recording files and expression files of instant messaging (IM) clients can be stored by using composite documents. As the use time of the IM tools increases, the corresponding composite documents will become bigger and bigger.

FIG. 1 is a schematic logical structure of a storage and streams of a composite document. The logic structure of the composite document is very similar to that of a file system, and each document includes a root storage each having from 0 to many storages or streams. Each storage and stream has a name, which is usually constituted by 16-bit Unicode characters and has a maximum length of 31 characters. The names of storages or streams in the same storage should be different, and the names of storages or streams in different storage can be the same.

Except the header, all data of the composite document are organized in the form of streams. All streams of the composite document are divided in to smaller data blocks, called as sectors. The sector can contain control data or user data. The whole composite document contains a header following with a series of sectors. All the sectors have the same size which is set in the header.

The sectors are listed in their order in the document. An index (starting from 0) of the sector is called as sector identifier (SID) which is a 32-bit signed integer value. If one SID is not smaller than 0, then it must point to an existing sector; if the value of one SID is negative, then it may have special meanings.

A linked list formed by all sectors of a stream is called as a sector chain. Adjacent sectors in the sector chain are not necessarily adjacent in the physical. In order to facilitate indicating each sector's relative position relationship in the sector chain, a concept of sector identifier chain is introduced. The sector identifier chain is a sector identifier array. The sector identifier chain sequentially records sector identifiers of the sectors of the stream starting from the sector identifier of the first sector of the stream and ended with a linked list termination (−2).

The streams of the composite document can be divided into inner controlling streams and user data streams according to the purposes. The inner controlling streams include a directory stream, a master sector allocation table (MSAT), a sector allocation table (SAT), a short sector allocation table (SSAT) and a short stream container stream.

The master sector allocation table is a SID array which sequentially indicates SID of the sectors which are used to store the sector allocation table. The size of the MSAT is equal to the number of sectors which are used to store SAT, and the size is stored in the header.

The SAT is a sector identifier array, and includes all the user data streams and the inner controlling streams. The size of the SAT is equal to the number of sectors existing in the whole composite document. An index of an element of the SAT array is the sector identifier represented by the element, and the value of the element is the next node of the sector represented by the element in the sector chain. The SAT can contain Free SID(−1) at any position, and these sectors will not be used by any stream; if this position contains End of SID Chain(−2), it means an end of one stream; if this position contains End of SID Chain(−3), it means that the presented sector is used to store SAT; if this position contains End of SID Chain(−4), it means that the presented sector is used to store MSAT. For example, if an element value of the SAT array is −1, then it means that a sector corresponding to the element index is not used by any stream; if the element value is −2, it means an end of one stream; if the element value is −3, it means that a sector corresponding to the element index is used to store SAT; if the element value is −4, it means that a sector corresponding to the element index is used to store MSAT.

The short stream container stream is the same as other common user stream which has a length not smaller than that of the standard stream. In the sector chain of the short stream container stream, SID of the first sector is stored in the directory entry of the root storage. A sector identifier chain of the short stream container stream can be obtained from SAT.

SSAT is another SID array, and it contains sector identifier chains of all the short streams. As an inner controlling stream, SSAT has the same establishment process as that of common streams. The first sector identifier of SSAT is stored in the header. As a sector allocation table, SSAT's function is very similar to that of SAT, and the unique difference is that the sector identifiers of SSAT point out to short sectors rather than common sectors.

The directory stream is an inner controlling stream, and includes a directory entry array. Each directory entry points to a storage or stream in the composite document. In the directory stream, a directory entry index starting from 0 is called as directory entry identifier (DID).

The aforementioned composite document does not control the allocation of the sectors, resulting in a large number of patches; I/O keeps jumping in the entire composite document, which will seriously affect the performance. The MSAT, SAT, SSAT and directory entry are distributed throughout the entire composite document, which seriously affects the performances of the composite document such as opening, traversing, reading and writing and so on; for streams and short streams, a too small allocation unit and the sector allocation with no control also result in a large number of patches.

SUMMARY

The problem to be solved by embodiments of the present invention is to provide a method and device for storing, reading and writing a composite document so as to reduce patches in the composite document.

Thus, one embodiment of the present invention provides a method for storing a composite document, the method includes: pre-allocating an initial storing area for an inner controlling stream of the composite document, wherein the initial storing area is continuous sectors or sector clusters; and storing the inner controlling stream in the initial storing area.

Correspondingly, one embodiment of the present invention also provides a method for reading and writing a composite document, the composite document uses the aforementioned method to store an inner controlling stream, the method for reading and writing a composite document includes:

when reading a sector or sector cluster of the inner control stream, judging whether one or more sectors or sector clusters adjacent to the sector or sector cluster also store the same type inner controlling stream as the inner controlling stream;

if the judgment result is yes, reading data stored in the sector or sector cluster and the one or more sectors or sector clusters adjacent to the sector or sector cluster in a one-time into a memory.

Meanwhile, one embodiment of the present invention also provides a device for storing a composite document, the device includes:

a controlling stream initial pre-allocation module configured to pre-allocate an initial storing area for an inner controlling stream of the composite document, wherein the initial storing area is continuous sectors or sector clusters;

a controlling stream second pre-allocation module configured to store the inner controlling stream in the initial storing area.

One embodiment of the present invention also provides a device for reading and writing a composite document, the composite document uses the aforementioned device to store an inner controlling stream, the device for reading and writing a composite document includes:

a sector judging module configured to, when reading a sector or sector cluster of the inner control stream, judge whether one or more sectors or sector clusters adjacent to the sector or sector cluster also store the same type inner controlling stream as the inner controlling stream;

a controlling stream reading module configured to, if the judgment result is yes, read data stored in the sector or sector cluster and the one or more sectors or sector clusters adjacent to the sector or sector cluster in a one-time into a memory.

In the solutions provided in the embodiments of the present invention, the pre-allocating storing space strategy is adopted for the inner controlling stream to conduct storage, reduces the patches of the inner controlling stream in the composite document. Correspondingly, pre-allocating storing area makes the probability of continuously storing the user data stream and the inner controlling stream in the composite document increased. The I/O can be optimized by introducing a strategy of reading cache and writing in a batch size, which can improve the efficiency of reading and writing.

DETAILED DESCRIPTION OF EXAMPLES

Figure 1:
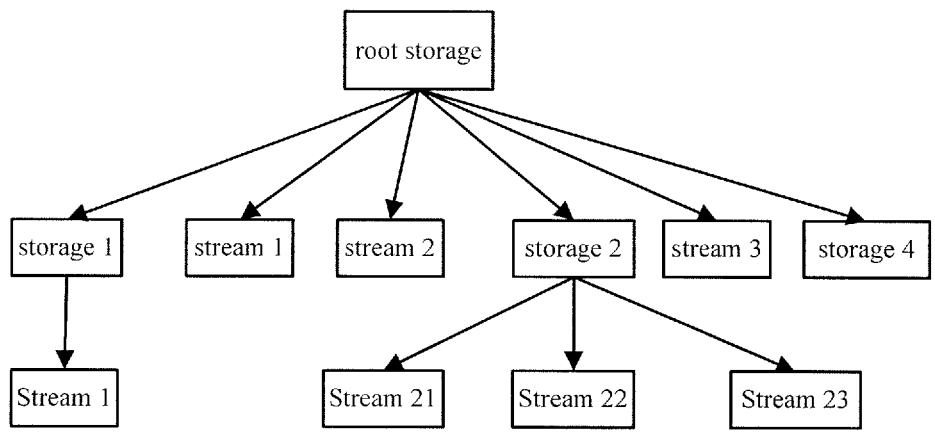
FIG. 1 is a schematic logical structure of a storage and streams of a composite document according to the prior art.

The technical solution of embodiments of the present invention is hereinafter further explained in details with reference to drawings of the embodiments of the present invention. Apparently, the described embodiments are only some embodiments of the present invention, are not the all the embodiments. Based on the embodiments of the present invention, other embodiments obtained by those skilled in the art without creative work shall be included in the protection scope of the invention.

In order to solve the problem of poor performance of opening, reading/writing in the existing Microsoft composite document caused by excessive patches, one embodiment of the present invention provides a new composite document which can be completely compatible with the existing Microsoft composite document format. In the composite document of the embodiment of the present invention, a pre-allocating strategy (i.e., pre-allocating a storing area with a certain size for an inner controlling stream and/or user data stream to conduct corresponding storage) is adopted to conduct storage of the composite document, to ensure the continuity of data blocks and reduce the generation of patches; further, corresponding to the storage mode of the composite document of the embodiment of the present invention, one embodiment of the present invention also provides a strategy of reading cache and writing in a batch size to optimize the I/O, thereby improving the performance of the composite document in opening, reading/writing.

Meanwhile, the composite document of the embodiment of the present invention can conduct the storage in the unit of sector or sector cluster. It is found in the prophase research that, in the MSAT, directory entry and SSAT of the existing Microsoft composite document, each sector is not continuous, and the allocation granularity is a sector of 512 bits. The allocation granularity is too smaller and the probability of formation of patches is increased. In order to reduce the patches from the root, the embodiment of the present invention redefines a larger allocation granularity: sector cluster (similar to a cluster in the disk manager). According to the criterion of the composite document, one stream which is smaller than 4K bytes (4×1024 bites, or represented as 4 KB) is a short stream. Thus, a granularity value which is larger than 4K bites such as 8K bites can be selected as the size of a cluster. In order to realize the cluster allocation unit mode, a very simple principle is defined as: each allocation allocates a sector aligned on 8K byte boundary, in this way, it can be ensured that the allocation granularity is not smaller than a sector cluster all the time. Since the size of the cluster 8K is nothing else but an integral time of 512 bytes, thus, the composite document of the embodiment of the present invention can be completely compatible with the existing Microsoft composite document format. Of course, according to the specific situations, the size of the cluster can also be other values, such as values which are integral times of the size of the sector.

Figure 2:
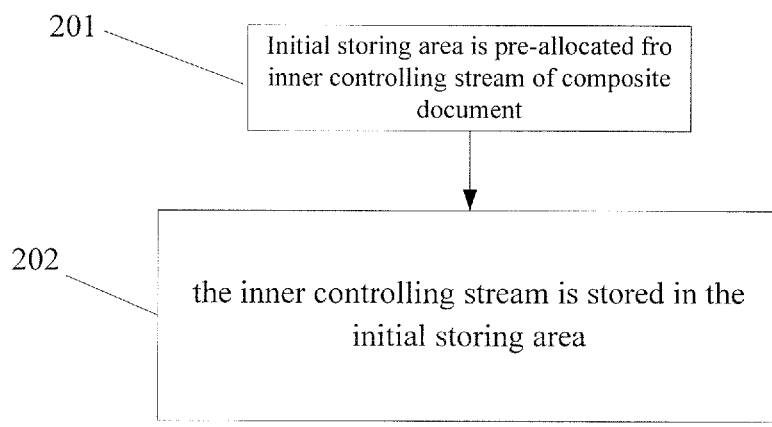
FIG. 2 is a schematic flow chart of a storage method with reference to a pre-allocating strategy of an inner controlling stream according to an embodiment of the present invention.

As mentioned above, in the composite document of the embodiment of the present invention, the pre-allocating strategy is adopted to conduct storage of the composite document. Since the natures of the inner controlling stream and the user data stream are different, thus, the concrete pre-allocating strategies are different. As shown in FIG. 2, a storage method with reference to the pre-allocating strategy of the inner controlling stream includes:

Step 201: an initial storing area is pre-allocated for an inner controlling stream of the composite document, and the initial storing area is continuous sectors or sector clusters;

In this embodiment or other embodiment of the present invention, the unit of the referred storage area can be the sector or the above mentioned sector cluster; however, no matter sectors or sector clusters, in one embodiment, there will be no use of a mixture of both of the sector and the sector cluster as storage unit; i.e., in the realization of one composite document, either the sector is adopted as a basic storage unit, or the sector cluster is adopted as a basic storage unit. That is to say, in the same embodiment, both of the inner controlling stream and the aftermentioned user data stream adopt the same basic storage unit to conduct storage.

The inner controlling stream of this embodiment can be one or more of a master sector allocation table, a sector allocation table, a short stream container stream, a short sector allocation table and a directory stream. That is to say, the solution of pre-allocating storing area of this embodiment can be adopted for one of the aforementioned concrete inner controlling streams such as MSAT of the composite document to conduct storage, and the solution of pre-allocating storing area of this embodiment can be adopted for some or all of the inner controlling streams of the composite document to conduct storage.

It should be noted, if it is for some or all of the inner controlling streams of the composite document, pre-allocating initial storing areas for the inner controlling streams of the composite document means pre-allocating different initial storing areas for various kinds of inner controlling streams, respectively.

Step 202: the inner controlling stream is stored in the initial storing area.

Since the embodiment of the present invention adopts the pre-allocating strategy, a storing area with a certain size is pre-allocated for the inner controlling stream to conduct storage of the composite document, thereby ensuring the continuity of the data block and reducing the generation of patches. Correspondingly, pre-allocating storing area makes the probability of continuously storing the inner controlling stream in the composite document increased, under this situation, the I/O can be optimized by introducing a strategy of reading cache and writing in a batch size, which can further improve the efficiency of reading and writing.

In the embodiment of the present invention, if the size of the inner controlling stream exceeds the initial storing area, the aforementioned method can further include: pre-allocating a second storing area to store the exceeded inner controlling stream and the second storing area being also continuous sectors or sector clusters.

In the embodiment of the present invention, because the inner controlling stream such as SAT is large or because an increase of the composite document causes an increase of SAT, the allocated initial storing area and the second storing area are not enough, then according to a pre-allocating space strategy, a new storing area can be pre-allocated to store the inner controlling stream. The pre-allocating space strategy means when the allocated storing area is not enough during storing the inner controlling stream, a new storing area is always pre-allocated to store the inner controlling stream, and all the pre-allocated storing areas each are continuous sectors or sector clusters, respectively.

Further, in the above embodiment, the size of the sector cluster and the pre-allocated storing space can specifically be: the sector cluster means a continuous complete sector with a size of 8K bytes; the size of a pre-allocated initial storing area is 8K bytes, the sizes of pre-allocated new storing areas can successively be 80K bytes (i.e., the second storing area), 800K bytes and 1M bytes. When the size of a previously pre-allocated storing area is 1M bytes, then the size of each following pre-allocated storing area is 1M bytes. Of course, the aforementioned sector cluster can also be a continuous complete sector with a size which is integral times of 4K.

Some embodiments of conducting the pre-allocating storage are given below according to the specific types of the inner controlling streams.

(1) Pre-Allocating Method for the Master Sector Allocation Table

If each MSAT can hold SID of 128 SAT sectors, then each SAT sector can hold SID of 128 sectors, in this way, one document of 1 G bytes needs in all a master sector allocation table with a size of 64K byte. 109 MSAT SID are included in the header of the composite document. In this way, even if not using additional MSAT, a composite document with a maximum size of 6.8 M bytes can be supported. 1 G=1024M=1024×1024K.

The pre-allocating method for the master sector allocation table includes continuously allocating a new storing area to conduct storage according to the size of MSAT and its increase situation. For example, the size of the initial storing area can be set to be 8K, the size of the second storing area can be 80K, and the sizes of the other continuously pre-allocated storing areas can successively be 80K, 800K, 1M, 1M, 1M . . . that is to say, the strategy for setting the size of the pre-allocated storing area can be: for the size smaller than 1M, the size increases according to multiples of 10, for the size larger than 1M, then the size is fixed to be 1M. For the pre-allocated storing areas which have been used, all the pre-allocated storing areas which have been used are strung into to form a MSAT sector chain, and SID for SAT not existing in the MSAT sector is filled with −1. For the document with a size smaller than 1.28 G, there is only one MSAT patch besides the header, therefore, the problem of merging MSAT does not have to be considered.

(2) Pre-Allocating Method for the Sector Allocation Table

According to the format definition of the composite document, the size of SAT is directly corresponding to the size of the document; theoretically, when the SAT table increases, the size of the composite document is also increased, but the size of data streams stored in the composite document may be unchanged. Because the existing Microsoft composite document does not include the concept about pre-allocation, its SAT table is increased together with the increase of the size of the composite document; however, the difference between the composite document of the embodiment of the present invention and the existing Microsoft composite document is that, the SAT table of the composite document of the embodiment of the present invention can be pre-allocated, at the time the size of the composite document increases, the size of the data stored in the composite document can remain unchanged.

Each SAT sector holds 128 sector SID, in this way, one document of 1 G bytes needs in all a master sector allocation table with a size of 8M.

Similar to the pre-allocating situation of MSAT, the initial size of the storing area of the SAT can also be 8K, and the sizes of the following allocated storing areas can successively be 80K, 800K, 1M, 1M, 1M . . . that is to say, for the size smaller than 1M, the size increases according to multiples of 10, for the size larger than 1M, then the size is fixed to be 1M. For the document with a size smaller than 800M, there are 8 patches. This mode has a few of SAT patches, and therefore, it is not needed to implement merging of SAT.

Since 4 bytes in the SAT table can point to a sector of a data stream (512 byte), if there is no pre-allocation, the space occupied by the SAT is 4/512, i.e., 1/128 of the composite document. The maximum size of the pre-allocating SAT space implemented in the embodiment of the present invention is 10 times of currently used SAT space. Therefore, SAT pre-allocation at most consumes 10/128=8% of the space of the composite document.

(3) Pre-Allocating Method for the Short Stream Container Stream

The short stream container stream is a container of a stream, and is used to store all streams of a user which are smaller than 4K. Generally, most of streams in the instant messaging tools belong to short streams, such as gif or bmp resource files and so on, and small configuration files. Thus, the patches of the short stream container stream will greatly affect the performance of the composite document.

Similar to the pre-allocating situation of MSAT, the pre-allocating initial size of the storing area of the short stream container stream can also be 8K, and others can successively be 80K, 800K, 1M, 1M, 1M . . . that is to say, for the size smaller than 1M, the size increases according to multiples of 10, for the size larger than 1M, then the size is fixed to be 1M. If the pre-allocating storing area is fixed allocated according to 1M, then 256 short streams can be added each time; according to the actual use experience, this speed is sufficient to meet the requirements.

(4) Pre-Allocating Method for the Short Sector Allocation Table

Although it seems that the size of SSAT must be direct proportion to the size of the short stream container stream, actually, SSAT of the composite document generated by Windows can exceed this value. In this way, the size of SSAT does not have to increase starting from 512 bytes. The pre-allocating method for the short sector allocation table is the same as the pre-allocating method for the short stream container stream, and also uses the model: increasing according to 8K, 80K, 800K, 1M, 1M, 1M . . . .

Because the short stream container stream does not need to exactly match the SSAT, thus, the trigger point of the expansion of the short stream container stream is in every time writing, when the capacity is not enough the capacity can be expanded (note: the maximum value after expansion can not exceed a size matching with the SSAT).

(5) Pre-Allocating Method for the Directory Stream

Taken Microsoft's composite document as an example, in its format definition, each directory entry is fixed 128 bytes.

The pre-allocating method for the directory stream uses a pre-allocating model which can be: initial 8 K (which can hold 64 directory entries), increasing according to 8K, 80K, 800K, 1M, 1M, 1M . . . ; a unused directory entry is set to be an empty directory entry. This way, if the number of directory entries is smaller than 6400, there are only two patches at 80K and 800K, and it does not have to achieve mergence of the directory streams.

In the aforementioned pre-allocating storing methods for various inner controlling streams, when the current pre-allocated capacity is not enough, the capacity can be expanded according to the aforementioned pre-allocating model; for example, the trigger point of the expansion of SAT is when the capacity is not enough to write data stream; the trigger point of the expansion of MSAT is when an increase of the SAT table causes the space for storing MSAT table not enough.

Figure 3:
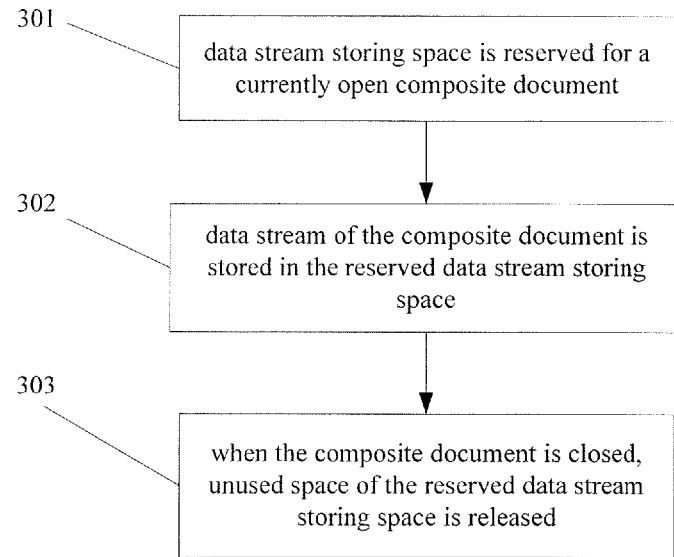
FIG. 3 is a schematic flow chart of a storing method of pre-allocating storing area for a user data stream according to an embodiment of the present invention.
Figure 4:
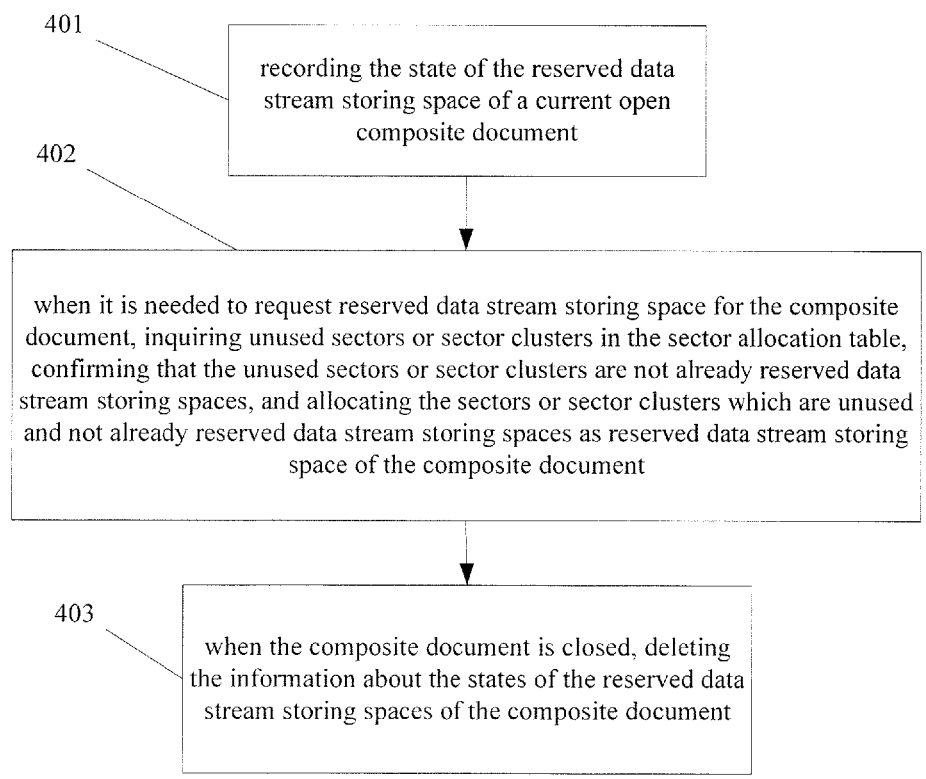
FIG. 4 is a schematic flow chart of recording state of a reserved data storing space for each user data stream in the storing method of FIG. 3.

The pre-allocating storing methods for the inner controlling streams are described above; as shown in FIG. 3, a storing method of pre-allocating storing area for the user data stream (or called as data stream), includes:

Step 301: data stream storing space is reserved for a current open composite document. That is to say, the pre-allocation of the user data stream adopts a reserving space mode: every time allocation of a new sector cluster or sector, a space with a specified size is reserved, and subsequent other objects shall not use the space. For example, when writing a data stream, a contiguous sector cluster larger than the size of current written data is allocated for this stream to write; because when writing the stream, it is likely that the stream may be written again later, in order to make data written in the two times continuous, a continuous space can be reserved for next writing when writing.

The data stream storing area can include common stream storing space and/or short stream storing space. Then, the common stream storing space in some embodiments can have a size of 50% or more of a length of a corresponding current stream, and the short stream storing space can have a size of 4K byte.

Step 302: data streams of the composite document are stored in the reserved data stream storing space.

Step 303: when the composite document is closed, unused space of the reserved data stream storing space is released.

Since, there may be multiple user data streams need to be processed currently, then it is needed to record the state of a reserved data stream storing space for each user data stream, so that the state of the reserved data stream storing space can be referred when it is needed to reserve a new data stream storing space, then, the aforementioned embodiment can further include:

Step 401: recording a state of the reserved data stream storing space of a current open composite document. For example, in a life cycle of from opening to closing the composite document, a reserved space state table can be created in a memory to keep tracking the state of the reserved space of the composite document, and can be referred when requesting idle sector clusters. Since more than one data stream of the composite document may be opened at the same time, thus, when achieving the aforementioned reserved space status table, for example, when codes are used to achieved the aforementioned table, the table can be a global map, therefore, the situations of the data stream reserved space for each data stream in the composite document are known by each stream.

Step 402: when it is needed to request reserved data stream storing space for the composite document, inquiring unused sectors or sector clusters in the sector allocation table, confirming that the unused sectors or sector clusters are not already reserved data stream storing spaces, and allocating the sectors or sector clusters which are unused and not already reserved data stream storing spaces as a reserved data stream storing space of the composite document. For example, when it is needed to request reserved storing space for one data stream of the composite document, inquiring unused sectors or sector clusters in the sector allocation table, confirming that the unused sectors or sector clusters are not storing spaces reserved by other data streams, and allocating sectors or sector clusters which are unused and not storing spaces reserved by other data streams as a reserved storing space of the data stream. For example, when requesting a new sector cluster, first finding a unused sector cluster from SAT, meanwhile, confirming the sector cluster does not belong to other object's reserved space before allocation. The reserved space in SAT does not record sector chain information.

Step 403: when the composite document is closed, deleting the information about the states of the reserved data stream storing spaces of the composite document. For example, when the composite document is closed, the reserved space state table is also destroyed at the same time and will not write any information into the document.

According to the storing methods described in the aforementioned embodiments, some embodiments of achieving the pre-allocating method for different data streams are described below according to the types of the user data streams.

(1) Pre-Allocating Method for the Common Stream

The pre-allocation for the common stream uses a reserved space model: since most of the time, streams which are currently open and have written operation are only a small part, thus, relatively large space can be reserved for these streams; every time the size of the pre-allocation is defined as 15% of the length of a current stream, thereby keeping more smaller patches. If the reserved space can not be used in the current open period, it will be used by other streams when the composite document is opened next time.

(2) Pre-Allocating Method for the Short Stream

In accordance with the provisions of the Microsoft composite document format, a stream which is smaller than 4K is a short stream. The pre-allocation for the short stream uses a reserved space model: in order to avoid patches appearing in a single short stream, 4K space is unified reserved for each short stream, regardless of each short stream's size. In the implementation, the sectors are allocated according to the principle of aligning the initial address on 4K to ensure that each short stream has a 4K space.

It can be seen from the above description that, the pre-allocating strategy is adopted to conduct storage of the inner controlling streams and the user data streams of the composite document, and can reduce the generation of patches in the composite document and ensure the continuity of the data.

After adoption of the pre-allocating strategy of the embodiment of the present invention, in theory, data of the composite document system are already large pieces, and some inner controlling streams such as SSAT/SAT are needed to be often visited and have a high repeated access frequency.

Although Windows have buffer prediction algorithm, the repeated access contents will be preferentially added to the cache, but since it does not understand the specific application of the data in the document, and does not know cache priority level of data, thus the prediction algorithm can not be 100% reliable. Therefore, for the composite documents using the methods described in the aforementioned embodiments to store, their reading and writing can correspondingly adopt the following method, to further improve the efficiency of reading and writing of the composite documents. In a method for reading and writing a composite document of one embodiment of the present invention, when reading an inner controlling stream, the method includes:

Step A1: when reading a sector or sector cluster of the inner control stream, judging whether one or more sectors or sector clusters adjacent to the sector or sector cluster also store the same type inner controlling stream as the inner controlling stream. The inner controlling stream can be one of a master sector allocation table, a sector allocation table, a short stream container stream, a short sector allocation table and a directory stream.

Step A2: if the judgment result is yes, reading the data stored in the sector or sector cluster and one or more sectors or sector clusters adjacent to the sector or sector cluster in a one-time into a memory.

For example, in the embodiment of the present invention, when it is needed to read one sector (or sector cluster) of SAT, it is first judged whether sectors (or sector clusters) adjacent to the sector (or sector cluster) also store SAT (the sector identifiers stored in the SAT array have some special marks, for example, −3 represents that what this sector stores is SAT), if yes, then this piece of data is read into the memory in a one-time. Because I/O consumption is mainly in the head jump, since it takes a lot of time to jump to the destination, a little more data should be read. Therefore, adoption of the aforementioned solution, without replacement of the Windows caching mechanism, it just simply voluntarily pre-reads a large piece of data which is needed to be frequent accessed, rather than reads a fixed number of pieces each time, this can greatly improve the efficiency of I/O.

On the other hand, when the user data stream is read, the existing Microsoft composite document reads and writes in the unit of Sector; if a chunk of data is read, it is needed to call in turn SetFilePointerEx and ReadFile one by one. This way has several negative effects: (1) when reading a sector, the system will pre-read and cache the following larger amount data, if the requested data block is greater than the size of the cache expected in the system, disk seeks will happen (average seek time of general hard drives is more than 10 ms); (2) SetFilePointerEx and ReadFile are called by the kernel, and call itself will have a consumption, only in the Hummer login process, the sum of ReadFile and SetFilePointerEx call is more than 40000 times; (3) frequent I/O can also affect system performance of the transaction documents to be developed.

Therefore, in the embodiment of the present invention, when reading a data stream, the following method is adopted:

B1: when reading a data stream, judging whether there is a continuous data block in the data stream;

B2: if the judgment result is yes, reading the data stream in batches according to a maximum continuous block.

Since the data stream pre-allocating space strategy can ensure the continuity of the stream data, thus, the reading cache strategy of the composite document of the embodiment of the present invention is to try to cache data of the current reading stream; the reading cache of the existing Microsoft composite document only caches data of a back part of the current sector, meanwhile, since there are more patches in the existing Microsoft composite document, this part of the data is likely not data of the current stream. Therefore, adoption of the aforementioned method for reading data of the embodiment of the present invention can solve the aforementioned problem in the existing technology.

On the other hand, since it is needed to frequently write/erase the SAT/SSAT entries during allocating and releasing of sector linked lists, in the embodiment of the present invention, the data blocks of the streams are continuous blocks, corresponding SAT table entries are also continuous, thus, when operating SAT table entries, the following steps can be adopted:

C1: when allocating and releasing of a sector linked list, judging whether a corresponding inner controlling stream entry is continuous;

C2: if the judgment result is yes, batch operating the continuous inner controlling stream entry.

Figure 5:
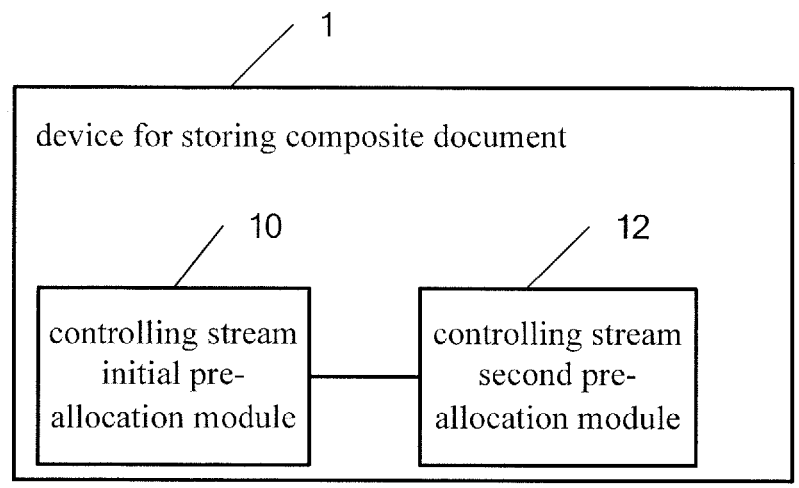
FIG. 5 is a schematic flow chart of a device for storing a composite document of one embodiment of the present invention.

Corresponding to the embodiments of the aforementioned methods, one embodiment of the present invention also provides a corresponding implementation device. As shown in FIG. 5, a corresponding device 1 for storing a composite document includes:

a controlling stream initial pre-allocation module 10, configured to pre-allocate an initial storing area for an inner controlling stream of the composite document, and the initial storing area being continuous sectors or sector clusters.

a controlling stream second pre-allocation module 12, configured to store the inner controlling stream in the initial storing area; and when the size of the inner controlling stream exceeds the initial storing area, to pre-allocate a second storing area to store the exceeded inner controlling stream; the second storing area being also continuous sectors or sector clusters.

The inner controlling stream can be one or more of a master sector allocation table, a sector allocation table, a short stream container stream, a short sector allocation table and a directory stream. When the inner controlling streams are more than one of the master sector allocation table, the sector allocation table, the short stream container stream, the short sector allocation table and the directory stream, the controlling stream initial pre-allocation module 10 is configured to pre-allocate different initial storing areas for various kinds of inner controlling streams, respectively.

Figure 6:
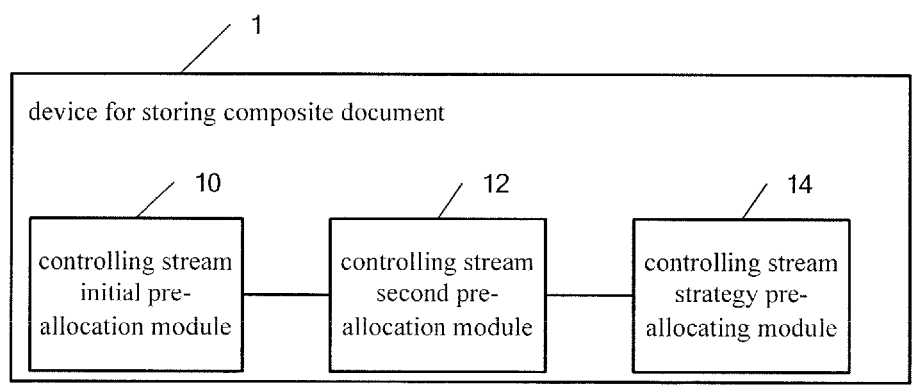
FIG. 6 is another schematic flow chart of the device for storing a composite document of the embodiment of the present invention.

As shown in FIG. 6, the device 1 can further include:

a controlling stream strategy pre-allocating module 14, configured to pre-allocate a new storing area to store the inner controlling stream according to a pre-allocating space strategy when the exceeded inner controlling stream exceeds the size of the second storing area. The pre-allocating space strategy means when the allocated storing area is not enough during storing the inner controlling stream, a new storing area is always pre-allocated to store the inner controlling stream, and all the pre-allocated storing areas each are continuous sectors or sector clusters, respectively.

In some embodiments, the sector cluster means a continuous complete sector with a size of 8K bytes; the size of pre-allocated initial storing area is 8K bytes, the size of pre-allocated new storing areas can successively be 80K bytes, 800K bytes and 1M bytes. When the size of a previously pre-allocated storing area is 1M bytes, then the size of each following pre-allocated storing areas is 1M bytes.

Figure 7:
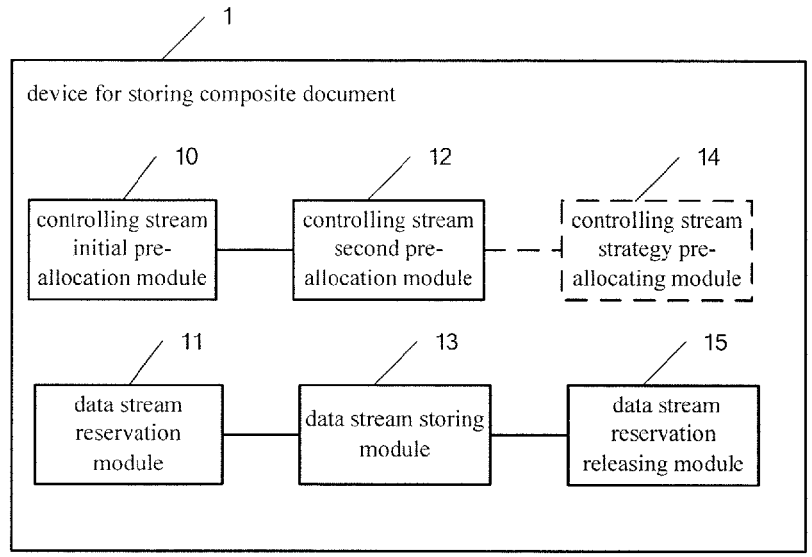
FIG. 7 is still another schematic flow chart of the device for storing a composite document of the embodiment of the present invention.
Figure 8:
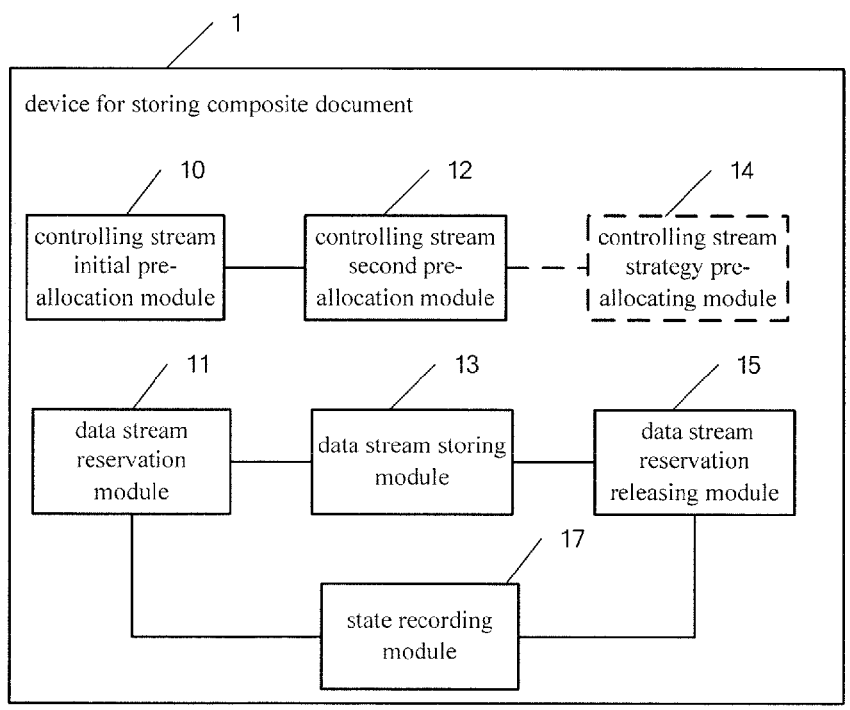
FIG. 8 is yet another schematic flow chart of the device for storing a composite document of the embodiment of the present invention.

As shown in FIGS. 7-8, the device 1 can further include:

a data stream reservation module 11, configured to reserve data stream storing space for a currently open composite document;

a data stream storing module 13, configured to store the data stream of the composite document in the reserved data stream storing space;

a data stream reservation releasing module 15, configured to release unused space of the reserved data stream storing space when the composite document is closed;

a state recording module 17, configured to record the state of the reserved data stream storing space of a current open composite document. If the state recording module 17 is included, then the data stream reservation releasing module 15 is also configured to inquire unused sectors or sector clusters in the sector allocation table, confirm that the unused sectors or sector clusters are not already reserved data stream storing spaces, and allocate the sectors or sector clusters which are unused and not already reserved data stream storing spaces as a reserved data stream storing space of the composite document when it is needed to request the reserved data stream storing space for the composite document. The data stream reservation releasing module 15 can also be configured to delete the information about the states of the reserved data stream storing spaces of the composite document when the composite document is closed.

The module and connection shown in the dotted line in FIGS. 7 and 8 represent that the composite document can include or not include the module.

In some embodiments, the data stream storing space can include common stream storing space and/or short stream storing space. The common stream storing space can have a size of 50% or more of a length of a corresponding current stream, and the short stream storing space can have a size of 4K bytes.

Figure 9:
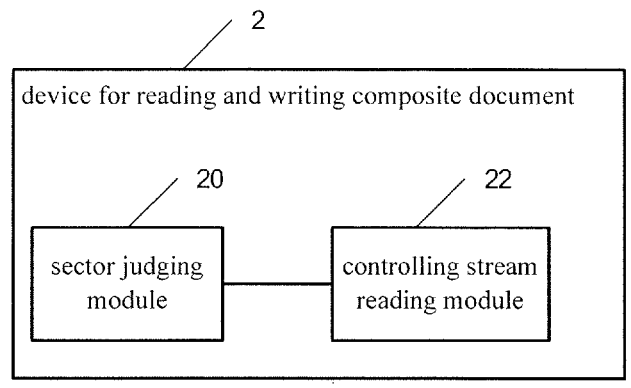
FIG. 9 is a schematic flow chart of a device for reading and writing a composite document of one embodiment of the present invention.
Figure 10:
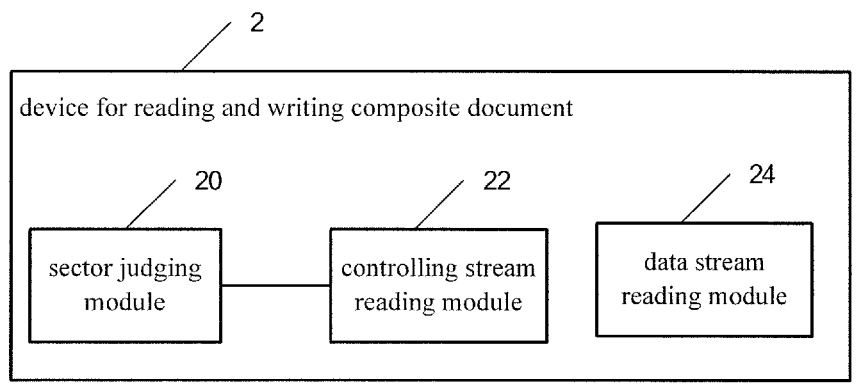
FIG. 10 is an another schematic flow chart of the device for reading and writing a composite document of the embodiment of the present invention.
Figure 11:
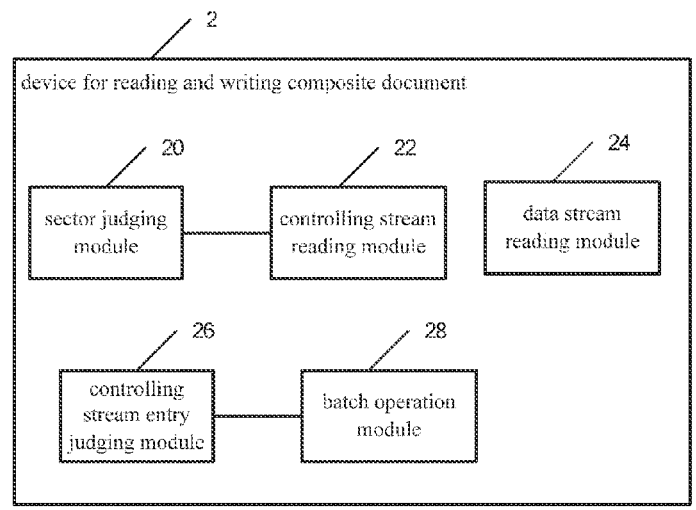
FIG. 11 is still another schematic flow chart of the device for reading and writing a composite document of the embodiment of the present invention.

Correspondingly, as shown in FIGS. 9-11, a device 2 for reading and writing a composite document of one embodiment of the present invention includes:

a sector judging module 20, configured to when reading a sector or sector cluster of the inner control stream, judge whether one or more sectors or sector clusters adjacent to the sector or sector cluster also store the same type inner controlling stream as the inner controlling stream;

a controlling stream reading module 22, configured to, if the judgment result is yes, read the data stored in the sector or sector cluster and one or more sectors or sector clusters adjacent to the sector or sector cluster in a one-time into the memory;

a data stream reading module 24, configured to judge whether there is a continuous data block in the data stream when reading the data stream, and read the data stream in batches according to the maximum continuous block if the judgment result is yes.

a controlling stream entry judging module 26, configured to judge whether corresponding inner controlling stream entry is continuous when allocating and releasing of sector linked lists;

a batch operation module 28, configured to batch operate the continuous inner controlling stream entry if the judgment result is yes.

The inner controlling stream can be one of a master sector allocation table, a sector allocation table, a short stream container stream, a short sector allocation table and a directory stream.

The concrete concepts and operation modes of the aforementioned device embodiment are consistent with those of the aforementioned method embodiment, and those will not be repeated here.

Using the pre-allocating strategy provided in the embodiments of the present invention to store the composite document and adopting the strategy of reading cache and writing in a batch size to conduct I/O simultaneously, can greatly improve the performance of the composite document in opening, reading/writing. Meanwhile, a composite document obtained by using the method for storing a composite document of the embodiment of the present invention can be completely compatible with the existing Microsoft composite document.

Compared with the existing Microsoft composite document, the reading speed of the composite document of the embodiment of the present invention is 4 times of that of the Microsoft composite document, the writing speed of the new composite document is about 100 times of that of the Microsoft composite document. It can be seen from FIGS. 12-14 that, the performance of the new composite document is much more than that of the Microsoft composite document.

Figure 12:
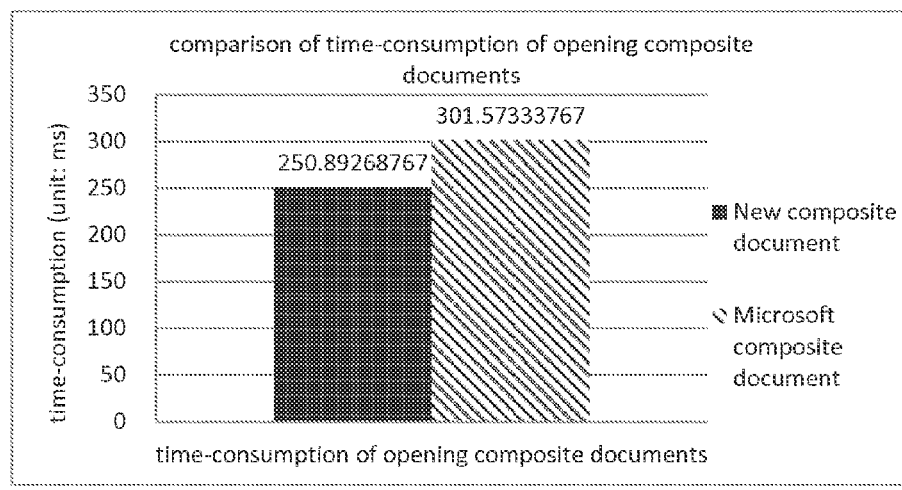
FIG. 12 is a schematic diagram showing a result comparison between a time consumption of using a Microsoft composite document interface to open a db1 and a time consumption of using the composite document interface of the embodiment of the present invention to open a db2.
Figure 13:
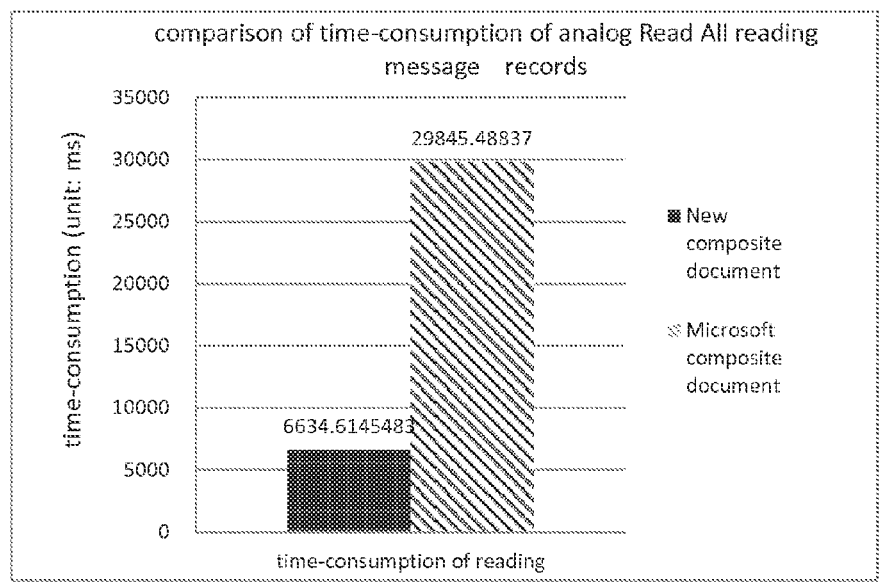
FIG. 13 is a schematic diagram showing a time-consumption comparison between using the Microsoft composite document interface to analog read 7 friend message records in the db1 and using the composite document interface of the embodiment of the present invention to analog read 7 friend message records in the db2.
Figure 14:
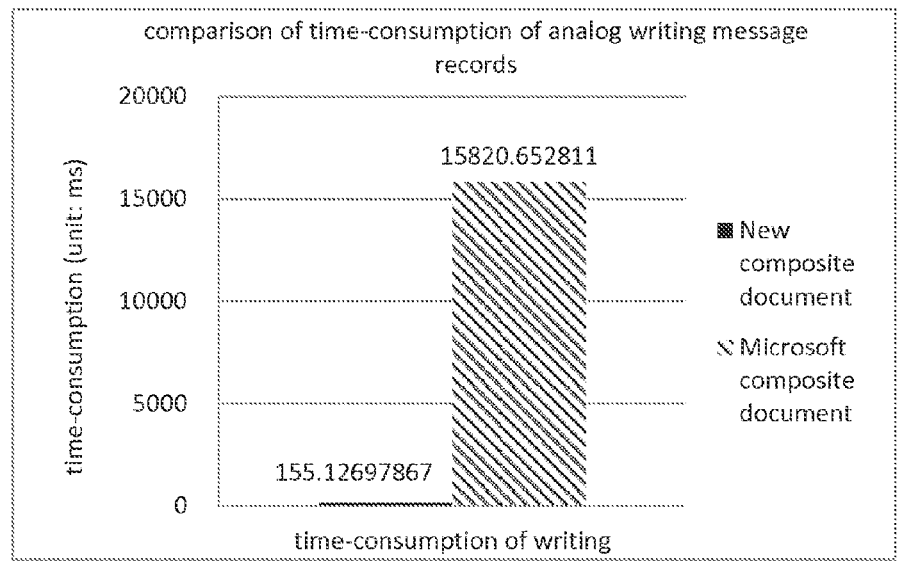
FIG. 14 is a schematic diagram showing a time-consumption comparison between using the Microsoft composite document interface to analog write 7 friend message records and using the composite document interface of the embodiment of the present invention to analog write 7 friend message records.

In FIGS. 12-14, a time consumption comparison between using the method of the embodiment of the present invention and using the method in the existing technology is indicated. FIG. 12 shows a result comparison between a time consumption of using Microsoft composite document (a composite document in the existing technology) interface to open db1 and a time consumption of using the composite document interface of the embodiment of the present invention to open db2; FIG. 13 shows a time consumption comparison between using Microsoft composite document interface to analog read 7 friend message records in db1 and using the composite document interface of the embodiment of the present invention to analog read 7 friend message records in db2; FIG. 14 shows a time consumption comparison between using Microsoft composite document interface to analog write 7 friend message records and using the composite document interface of the embodiment of the present invention to analog write 7 friend message records.

The composite documents db used in the aforementioned 3 experiments are generated by simulating the message record generation process of instant messaging tools: using Microsoft composite document interface to generate a composite document data of 600 M byte (called as db1) and using the composite document interface of the embodiment of the present invention to generate a composite document data of 600M byte (called as db12).

According to the above description of examples, it can be clearly understood by those skilled in the art that the present invention can be realized by software accompanying with necessary general hardware platforms, or by hardware. Based on this, the essential part of the technical solution of the present invention or the part contributed to the prior art can be in the form of a software product, and the computer software product is stored in a computer readable storage medium such as ROM/RAM, diskette or compact disc and includes several codes to make a computer device (such as a personal computer, a server or a network device) perform the method in each of the embodiments or some parts of the embodiments of the present invention.

The foregoing embodiments are not used for limiting the scope of the invention. Any modifications, equivalent substitutions and improvements made within the spirit and principle of the invention should be covered within the protection scope of the invention.

The invention claimed is:

1. A method for storing a composite document implemented by a processor, the method comprising:
   pre-allocating an initial storing area for an inner controlling stream of the composite document, wherein the initial storing area is continuous sectors or sector clusters;
   storing the inner controlling stream in the initial storing area;
   wherein when a size of the inner controlling stream exceeds the initial storing area, pre-allocating a second storing area to store exceeded inner controlling stream, wherein the second storing area is continuous sectors or sector clusters.

2. The method according to claim 1, wherein the inner controlling stream is one or more of a master sector allocation table, a sector allocation table, a short stream container stream, a short sector allocation table and a directory stream.

3. The method according to claim 2, wherein when the inner controlling stream is more than one of the master sector allocation table, the sector allocation table, the short stream container stream, the short sector allocation table and the directory stream, the pre-allocating an initial storing area for an inner controlling stream of the composite document means pre-allocating different initial storing areas for various kinds of inner controlling streams, respectively.

4. The method according to claim 1, further comprising:
   when the exceeded inner controlling stream exceeds a size of the second storing area, pre-allocating a new storing area to store the inner controlling stream according to a pre-allocating space strategy,
   wherein the pre-allocating space strategy means when an already allocated storing area is not enough during storing the inner controlling stream, a new storing area is always pre-allocated to store the inner controlling stream, and all the pre-allocated storing areas each are continuous sectors or sector clusters, respectively.

5. The method according to claim 4, wherein the sector cluster means a continuous complete sector with a size of 8K bytes; in the pre-allocating space strategy, a size of the pre-allocated initial storing area is 8K bytes, sizes of pre-allocated new storing areas are successively 80K bytes, 800K bytes and 1M bytes; when a size of a previously pre-allocated storing area is 1M bytes, a size of each following pre-allocated storing area is 1M bytes.

6. The method according to claim 1, further comprising:
   reserving a data stream storing space for a current open composite document;
   storing a data stream of the composite document in the reserved data stream storing space;
   releasing unused space of the reserved data stream storing space when the composite document is closed.

7. The method according to claim 6, further comprising:
   recording state of the reserved data stream storing space of the current open composite document;
   wherein the reserving a data stream storing space for a current open composite document comprises: when it is needed to request the reserved data stream storing space for the composite document, inquiring unused sectors or sector clusters in the sector allocation table, confirming that the unused sectors or sector clusters are not already reserved data stream storing spaces, and allocating the sectors or sector clusters which are unused and not already reserved data stream storing spaces as the reserved data stream storing space of the composite document;
   the releasing unused space of the reserved data stream storing space when the composite document is closed further comprises: when the composite document is closed, deleting information about the state of the reserved data stream storing spaces of the composite document.

8. A method for reading and writing a composite document implemented by a processor, the composite document using the method according to claim 1 to store an inner controlling stream, the method for reading and writing a composite document comprising:

when reading a sector or sector cluster of the inner control stream, judging whether one or more sectors or sector clusters adjacent to the sector or sector cluster also store the same type inner controlling stream as the inner controlling stream;

if the judgment result is yes, reading data stored in the sector or sector cluster and the one or more sectors or sector clusters adjacent to the sector or sector cluster in a one-time into a memory.

9. The method according to claim 8, wherein the composite document uses a reserved data stream storing space to store a data stream, the method for reading and writing a composite document further comprises:

when reading the data stream, judging whether there are continuous data blocks in the data stream; if the judgment result is yes, reading the data stream in batches according to a maximum continuous block;

when allocating and releasing sector linked lists, judging whether a corresponding inner controlling stream entry is continuous; if the judgment result is continuous, batch operating the continuous inner controlling stream entry.

10. A device for storing a composite document, comprising a processor coupled to a memory storing instructions, for executing by the processor, configured to:

pre-allocate an initial storing area for an inner controlling stream of the composite document, wherein the initial storing area is continuous sectors or sector clusters;

store the inner controlling stream in the initial storing area;

wherein the processor is further configured to, when a size of the inner controlling stream exceeds the initial storing area, pre-allocate a second storing area to store the exceeded inner controlling stream, wherein the second storing area is also continuous sectors or sector clusters.

11. The device according to claim 10, wherein the inner controlling stream is one or more of a master sector allocation table, a sector allocation table, a short stream container stream, a short sector allocation table and a directory stream;

wherein when the inner controlling stream is more than one of the master sector allocation table, the sector allocation table, the short stream container stream, the short sector allocation table and the directory stream, the controlling stream initial pre-allocation module is configured to pre-allocate different initial storing areas for various kinds of inner controlling streams, respectively.

12. The device according to claim 10, wherein the processor is further configured to:

we-allocate a new storing area to store the inner controlling stream according to a pre-allocating space strategy when the exceeded inner controlling stream exceeds a size of the second storing area;

wherein the pre-allocating space strategy means when an already allocated storing area is not enough during storing the inner controlling stream, a new storing area is always pre-allocated to store the inner controlling stream, and all the pre-allocated storing areas are continuous sectors or sector clusters, respectively.

13. The device according to claim 10, wherein the processor is further configured to:

reserve a data stream storing space for a current open composite document;

store a data stream of the composite document in the reserved data stream storing space;

release unused space of the reserved data stream storing space when the composite document is closed.

14. The device according to claim 13, wherein the processor is further configured to:

record state of the reserved data stream storing space of the current open composite document;

wherein the processor is further configured to inquire unused sectors or sector clusters in the sector allocation table, confirm that the unused sectors or sector clusters are not already reserved data stream storing spaces, and allocate the sectors or sector clusters which are unused and not already reserved data stream storing spaces as the reserved data stream storing space of the composite document when it is needed to request the reserved data stream storing space for the composite document;

the processor is further configured to delete information about the state of the reserved data stream storing spaces of the composite document when the composite document is closed.

15. A device for reading and writing a composite document, the composite document using the device according to claim 10 to store an inner controlling stream, the device for reading and writing a composite document comprising a processor coupled to a memory storing instructions, for executing by the processor, configured to:

when reading a sector or sector cluster of the inner control stream, judge whether one or more sectors or sector clusters adjacent to the sector or sector cluster also store the same type inner controlling stream as the inner controlling stream;

if the judgment result is yes, read data stored in the sector or sector cluster and the one or more sectors or sector clusters adjacent to the sector or sector cluster in a one-time into a memory.

16. The device according to claim 15, wherein the inner controlling stream is one of a master sector allocation table, a sector allocation table, a short stream container stream, a short sector allocation table and a directory stream;

the composite document uses a reserved data stream storing space to store a data stream, the processor is further configured to:

judge whether there are continuous data blocks in the data stream when reading the data stream, and read the data stream in batches according to a maximum continuous block if the judgment result is yes;

judge whether a corresponding inner controlling stream entry is continuous when allocating and releasing of sector linked lists;

batch operate the continuous inner controlling stream entry if the judgment result is continuous.

* * * * *